MAGNETIC INK PARTICLES

PHOTOMICROGRAPH 150X

INVENTOR.
ROBERT J. BROWN

BY
William V. Schelberg
AGENT

July 3, 1962 R. J. BROWN 3,042,616

PROCESS OF PREPARING MAGNETIC INK

Filed Aug. 26, 1958 4 Sheets-Sheet 2

July 3, 1962 R. J. BROWN 3,042,616

PROCESS OF PREPARING MAGNETIC INK

Filed Aug. 26, 1958 4 Sheets-Sheet 3

July 3, 1962 R. J. BROWN 3,042,616

PROCESS OF PREPARING MAGNETIC INK

Filed Aug. 26, 1958 4 Sheets-Sheet 4

3,042,616
PROCESS OF PREPARING MAGNETIC INK

Robert J. Brown, Yorktown Heights, N.Y., assignor to International Business Machines Corporation, New York, N.Y., a corporation of New York Filed Aug. 26, 1958, Ser. No. 757,401
13 Claims. (Cl. 252—62.5)

This invention relates to a magnetic ink and more particularly to a method of preparing such an ink for use in high speed magnetic printing.

The process of magnetic printing or ferromagnetography comprises forming a latent magnetic image on a magnetic recording medium, such as a magnetic drum, developing the latent image, and printing the thus developed image onto a suitable material to obtain a permanent character. The magnetic image in the form of localized magnetic fields in a high retentivity magnetic material, is developed by directing minute particles of magnetic material known as magnetic ink onto a magnetic recording surface where, by the process of magnetic attraction, a visible image appears in the outline of the original latent image. The magnetic ink in the outline of the developed image is then affixed to a recording surface, such as paper, by applying heat and/or pressure to the ink. Various apparatus for carrying out the process of ferromagnetography are described in detail in U.S. Patent 2,802,049.

The rate at which characters are printed onto a record material defines the printing speed of the machine. These speeds appear to be limited by the rate at which the magnetic inks are transferred from the containing hopper and by the ease of application of the ink to the magnetic drum surface. In order to achieve high printing speeds in magnetic printing machines, magnetic inks must be provided which will be particularly suitable in operation during these critical steps.

Conventional magnetic inks for magnetic printing machines have been prepared by wetting the magnetic material with a resinous solution, spraying such wetted particles over a large surface and air-drying. One obtains by this process, only an aggregate of magnetic ink particles having large particle sizes, requiring a subsequent vigorous grinding treatment to reduce the particles to the desired fine size. Magnetic inks prepared as described above are observed to be decidely angular in shape with sharp corners and edges and, therefore, do not flow readily through apertures or apply easily to a rotating surface. Another disadvantage of the conventional process resides in the fact that, because a grinding operation is necessary, only certain durable resins may be used in the ink formulation. These resins often need the application of both heat and pressure in order to record a printed character.

Accordingly, an object of this invention is to provide a new and improved magnetic ink, especially suitable for use in magnetic printing machines.

A further object is to devise methods whereby such magnetic inks may be conveniently prepared.

Other objects of the invention will be pointed out in the following description and claims and illustrated in the accompanying drawings, which disclose, by way of example, the principle of the invention and the best mode, which has been contemplated of applying that principle.

Figure 1:
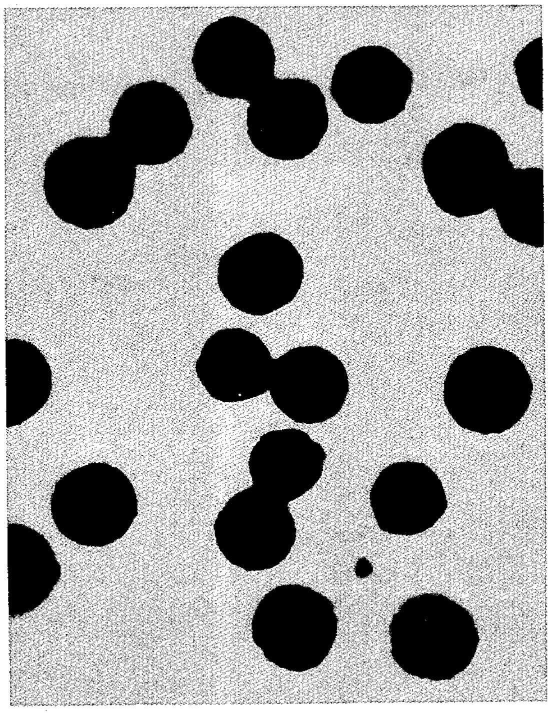
FIG. 1 is a reproduction of an actual photomicrograph of the spherical magnetic ink particles of the present invention.

According to the practice of this invention, a magnetic ink is provided which enables the magnetic printing of permanent, legible characters at speeds hitherto unattainable with conventionally prepared magnetic inks. For example, printing speeds in the order of 125 character inches per second are readily realized using the magnetic ink materials of this invention. These results are attributed to the fact that the magnetic inks provided herein are essentially spherical in shape with little tendency to cluster and, therefore, are more mobile and free flowing than other similar inks. The spherical magnetic ink particles are shown in FIG. 1, which is a reproduction of an actual photomicrograph taken on a representative sample prepared according to the process of this invention.

Figure 2:
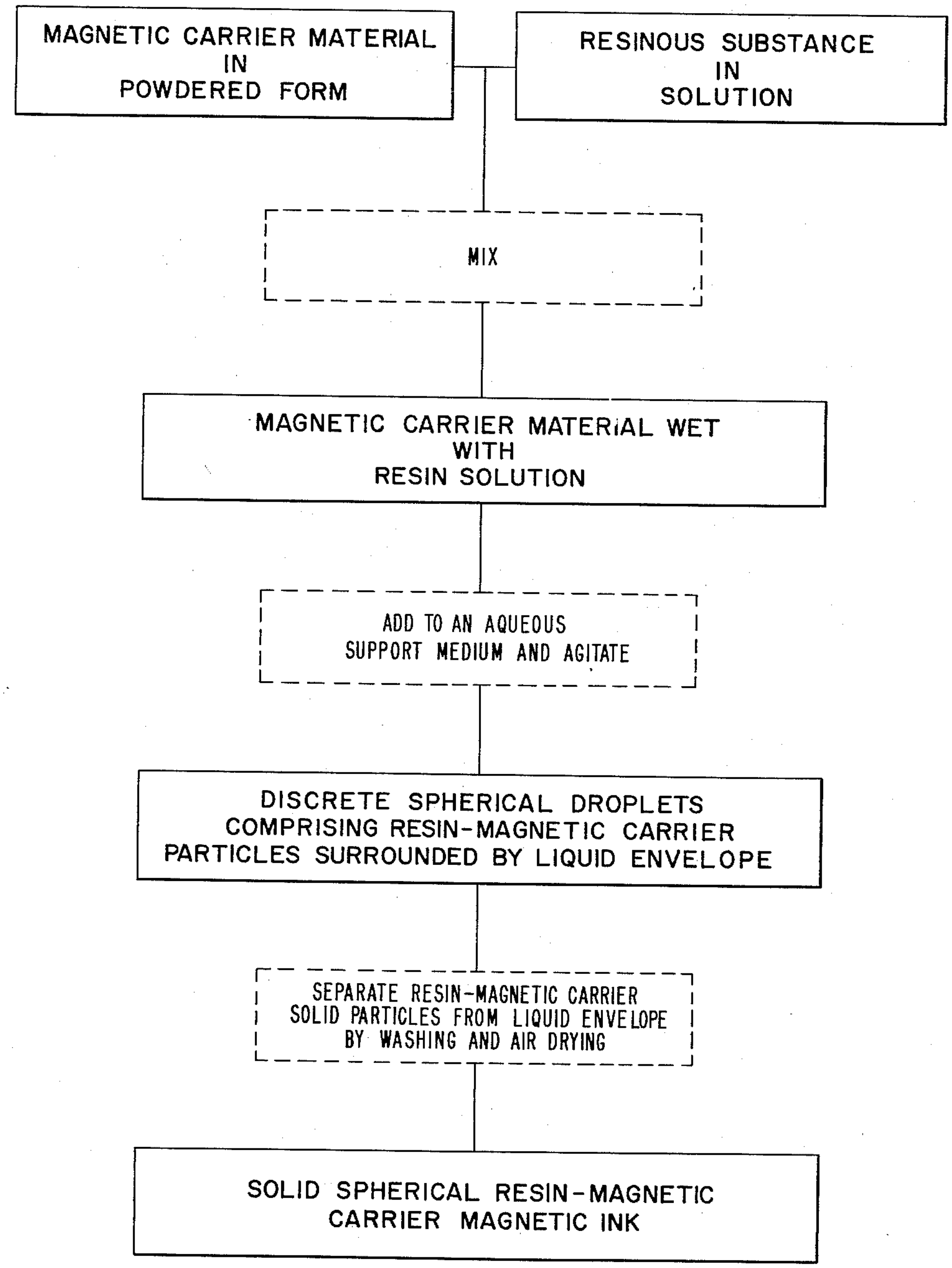
FIG. 2 is a generalized flow sheet showing the steps used in preparing the magnetic ink according to this invention.

The generalized steps used in preparing the magnetic ink are presented in the flow sheet of FIG. 2. The initial step comprises wetting a soft, powdered magnetic carrier material having a high permeability with a suitable resinous solution. While iron is a preferred magnetic material, nickel, cobalt, iron oxide, ferrites and alloys of iron, nickel, cobalt and molybdenum may be used. The resinous binder should be susceptible of flowing and adhering to a record medium such as paper under the influence of slight heat and/or moderate to heavy pressure. Suitable resins are thermoplastic epoxides, asphaltics, polyamides, polystyrenes, coumarene-indenes and petroleum hydrocarbons.

The wetted magnetic particles are then added to an aqueous support medium with vigorous agitation, resulting in the formation of small, spherical liquid droplets, comprising iron-resin materials surrounded by a sheath of solvent liquid, which are maintained discretely in the support medium. The solvent sheath is then separated from the solid material, preferably by extraction with large amounts of water, whereupon the liquid material solidifies or gels as individual spherical magnetic carrier-resin particles. The mixture is then filtered and the solid spheres are washed with several portions of water to remove the last traces of resin solvent. Air drying finally produces a magnetic ink which is essentially spherical in shape and about 25–50 microns in diameter.

The support medium may comprise a slurry of a finely divided inert inorganic solid, a viscous organic material, or a combination of both. Among the suitable inorganic substances are calcium carbonate, talc and calcium silicate. Preferable organic materials include glycerol and dilute solutions of methyl cellulose, gelatin and agar agar, which are readily separable from the ink particles by extraction with water.

Figure 3:
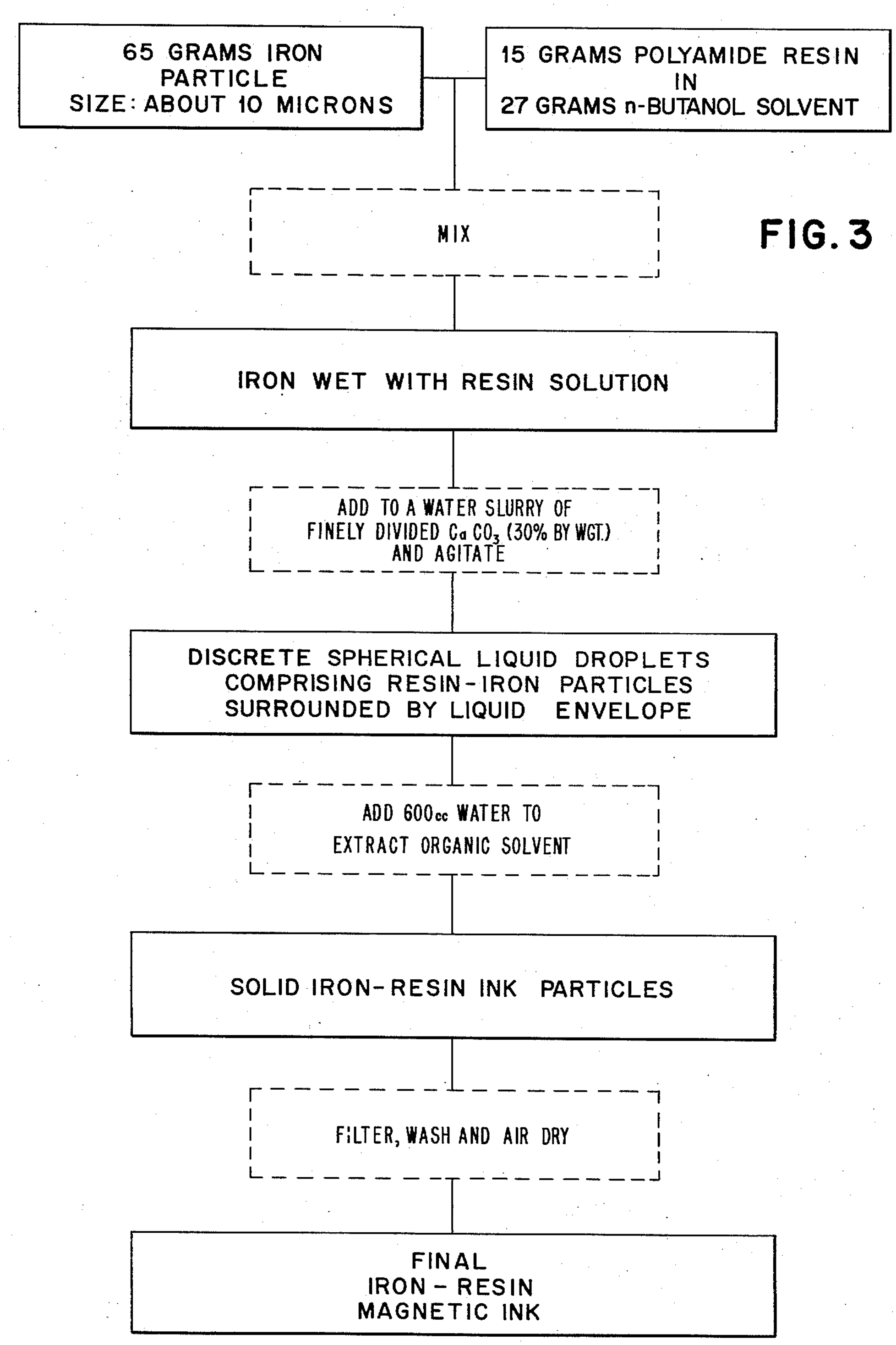
FIG. 3 shows another flow sheet indicating the steps used according to one embodiment of the present invention.

FIG. 3 illustrates a preferred embodiment of the general process described above. Powdered iron particles, such as sold under the trademark, "Carbonyl L," are wetted with a solution comprising a thermoplastic polyamide resin such as sold under the trademark, "Versamid 940" preferably dissolved in a partially water miscible solvent such as normal or secondary butyl alcohol. The iron-resin mixture is then added with agitation to a water slurry of finely divided $CaCO_3$, whereupon discrete spherical droplets comprising iron-resin particles surrounded by a solvent sheath are formed. The droplets are then solidified as individual spheres by the addition of a large amount of water which extracts the enclosing solvent sheath. Subsequent filtration leaves individual spherical iron-resin particles which are finally air-dried to produce the resultant magnetic ink. The use of a partially water miscible solvent is desirable in order that extraction of the solvent sheath may proceed in a step by step manner, thereby enabling the solidified ink particles to retain the spherical shape of the liquid droplet.

Figure 4:
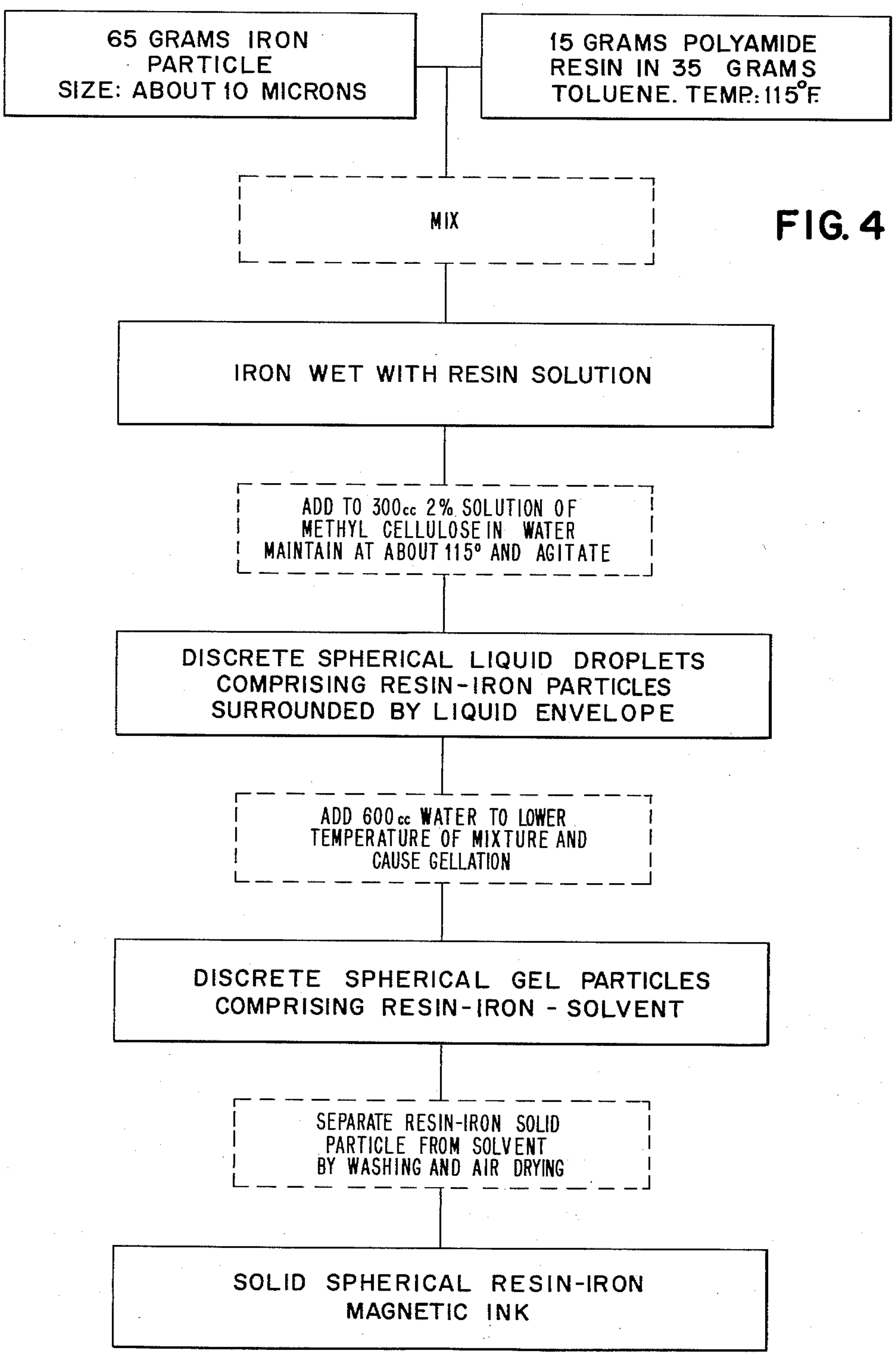
FIG. 4 is a similar flow chart showing another sequence of steps which may be used according to a second embodiment.

The embodiment illustrated in flow sheet, FIG. 4, shows the utilization of an intermediate gel state through which the spherical liquid droplets may pass before being solidified into the final magnetic ink. In operation, discrete iron-resin droplets, wet with resin solvent, preferably one immiscible with water, such as hydrocarbon, are formed at elevated temperatures within a support medium, such as a viscous organic polymer. The mixture is cooled by the addition of water, causing the droplets to gel. The gel is then extracted with additional water and subsequently air dried to leave spherical magnetic ink particles.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. A process of preparing magnetic ink adapted for high speed magnetic printing which comprises the steps of wetting powdered iron having a particle size of about 10 microns with polyamide resin dissolved in n-butanol, adding said wetted material with agitation to a finely divided aqueous slurry of calcium carbonate to form spherical liquid droplets discretely maintained in said aqueous slurry and comprising magnetic carrier-resin material surrounded by a sheath of solvent, extracting the solvent sheath by the addition of water to cause thereupon solidification of the magnetic carrier-resin particles as essentially individual solid spheres, filtering the mixture, washing the solid spheres and finally, air drying to produce magnetic ink particles of approximately 25–50 microns in diameter.

2. A process of preparing magnetic ink suitable for use in high speed magnetic printing which comprises the steps of wetting a magnetic carrier substance having a particle size of about 10 microns and having a high permeability with a solution of a water insoluble resin maintained at temperatures of about 100° F., adding said wetted substance with agitation to an aqueous solution of a viscous organic material support medium to form thereby small spherical liquid droplets discretely maintained in said support medium and comprising solid magnetic carrier-resin material surrounded by a sheath of water immiscible solvent, cooling said mixture by the addition of water to cause gellation of the droplets, washing and air drying the gel particles to cause said particles to solidify thereby as spherical magnetic carrier-resin magnetic ink particles.

3. The process of claim 2 where said resin is a polyamide resin and said water immiscible solvent is toluene.

4. The process according to claim 2, wherein the support medium is a dilute solution of methyl cellulose.

5. A process of preparing magnetic ink suitable for use in magnetic printing machines which comprises the steps of wetting a magnetic carrier substance having a particle size in the order of microns and having a high permeability with a solution of a water insoluble resin capable of being affixed to a record material, providing an aqueous slurry of a finely divided water-insoluble inert inorganic solid support medium for said wetted substance, agitating the mixture to form spherical liquid droplets discretely maintained in the support medium and comprising magnetic carrier, resin and a partially water miscible solvent and then extracting the solvent therefrom to cause thereupon solidification of the magnetic carrier-resin particles as essentially solid spheres.

6. The process according to claim 5 wherein the magnetic carrier substance is iron having a particle size of about 10 microns.

7. The process according to claim 5 wherein the resin is a polyamide resin.

8. The process according to claim 5 wherein the resin solvent is n-butanol.

9. A process of preparing magnetic ink suitable for use in magnetic printing machines which comprises the steps of wetting a magnetic carrier substance having a particle size in the order of microns and having a high permeability with a solution of a water insoluble resin capable of being affixed to record material, providing a viscous organic material support medium which is readily extractible with water for said wetted substance, agitating the mixture to form spherical liquid droplets discretely maintained in the support medium and comprising magnetic carrier, resin and a water immiscible solvent and then extracting the solvent therefrom to cause thereupon solidification of the magnetic carrier-resin particles as essentially solid spheres.

10. The process according to claim 9 wherein the magnetic carrier substance is iron having a particle size of about 10 microns.

11. The process according to claim 9 wherein the resin is a polyamide resin.

12. A process of preparing magnetic ink suitable for use in magnetic printing machines which comprises the steps of wetting a magnetic carrier substance having a particle size in the order of microns and having a high permeability with a solution of a water insoluble resin capable of being affixed to record material, providing a dilute solution of methyl cellulose for said wetted substance, agitating the mixture to form spherical liquid droplets discretely maintained in said dilute solution and comprising magnetic carrier, resin and a water immiscible solvent and then extracting the solvent therefrom to cause thereupon solidification of the magnetic carrier-resin particles as essentially solid spheres.

13. A process of preparing magnetic ink suitable for use in magnetic printing machines which comprises the steps of wetting a magnetic carrier substance having a particle size in the order of microns and having a high permeability with a solution of a water insoluble resin capable of being affixed to a record material, providing an aqueous slurry of finely divided calcium carbonate for said wetted substance, agitating the mixture to form spherical liquid droplets discretely maintained in said aqueous slurry and comprising magnetic carrier, resin and a partially water miscible solvent and then extracting the solvent therefrom to cause thereupon solidification of the magnetic carrier-resin particles as essentially solid spheres.

References Cited in the file of this patent

UNITED STATES PATENTS

| | | |
|---|---|---|
| 2,508,705 | Beller et al. | May 23, 1950 |
| 2,584,318 | Allyn | Feb. 5, 1952 |
| 2,623,827 | Moos | Dec. 30, 1952 |
| 2,671,451 | Bolger | Mar. 9, 1954 |
| 2,681,322 | Auer | June 15, 1954 |
| 2,711,375 | Sandberg | June 21, 1955 |
| 2,730,456 | Green et al. | Jan. 10, 1956 |
| 2,730,457 | Green et al. | Jan. 10, 1956 |
| 2,760,945 | Bodenschatz et al. | Aug. 28, 1956 |
| 2,800,457 | Green et al. | July 23, 1957 |
| 2,800,458 | Green | July 23, 1957 |
| 2,804,401 | Cousino | Aug. 27, 1957 |
| 2,971,916 | Schleicher et al. | Feb. 14, 1961 |

FOREIGN PATENTS

| | | |
|---|---|---|
| 3,605 | Great Britain | 1881 |